3,333,840
METHOD OF LINING A METALLURGICAL FURNACE AND THE PRODUCT THEREOF
Ernest P. Weaver, Pittsburgh, and George R. Henry, Bethel Park, Pa., assignors to Harbison-Walker Refractories Company, Pittsburgh, Pa., a corporation of Pennsylvania
No Drawing. Filed Nov. 30, 1964, Ser. No. 414,891
5 Claims. (Cl. 266—43)

The present invention relates to a metallurgical furnace and a monolithic refractory lining therefor.

Various types of refractory materials are used in large tonnages for installing complete linings and maintaining existing linings by means of pneumatic emplacement, called "gunning" in the refractories art, and the like. Basic refractory gunning mixes are supplied for maintaining open hearth and electric furnace walls and roofs and like environments coming in contact with chemically basic fumes and slags. Fire clay and high alumina gunning mixes are used for maintenance and in the walls and arches in slag heating furnaces, soaking pits, and similar environments in which neutral or acid refractories are required. This invention relates particularly to the class "basic" refractories.

There are two types, generally, of gasic gunning refractories as far as methods of installation are concerned. The first is a finely divided air-setting refractory. It may be applied to cold surfaces but is particularly useful where installation temperatures are high. As noted, this material is finely divided and, normally, is blended with water to form a slurry in a mixer for application with a "wet gun." The second type uses a coarser size graded mix, wherein, normally, water is mixed with the refractory material at the gunning apparatus nozzle. This is a "dry gun" application. The latter method is particularly applicable to the present invention; however, without the addition of an aqueous carrier fluid.

An object of the present invention is to provide a monolithic refractory lining capable of being fabricated in situ between furnace heats and while the furnace is maintained at an elevated temperature.

Another object of the invention is to provide a monolithic basic refractory lining formed on its situs of use by gunning techniques without the use of an aqueous carrier fluid.

Another object of the invention is to provide a method for the in situ fabrication of a refractory lining on a heated surface.

Still another object of the invention is to provide coated granular particles for use with gunning techniques. Other objects of the invention will appear hereinafter.

In accordance with one aspect of the present invention, basic refractory granular particles, containing on the burned basis a total of at least 90%, by weight, of MgO, $SiO_2$ and CaO and in which the weight ratio of CaO to $SiO_2$ is in excess of that required to form dicalcium silicate, are mixed with nonrefractory material consisting of a total of at least 85%, by weight, of $SiO_2$ and CaO (in about a 1 to 1 ratio) and a tempering agent, such as, water to provide a relatively thin coating of the nonrefractory material on the granular particles. The constituents are mixed in such proportions that the overall weight ratio of CaO to $SiO_2$ is about 1.87 to 1. The coated granular particles are then dried.

The coated particles are forcefully impacted, preferably with a dry gun and without the use of an aqueous carrier fluid on a surface within the furnace requiring the refractory material. It is important, that the surface to which the refractory be applied is maintained at a temperature higher than that of incipient fusion of the nonrefractory material. While this may at first appear to be a detriment, it is actually a benefit since the refractory lining may be fabricated while a furnace is in operation; for example, between furnace heats. Further, the nonrefractory coating becomes sufficiently fluid upon contact with the heated surface to adhere thereto with a minimum of rebound. Also, as the less refractory material melts, the liquid formed reacts with the lime of the coarse refractory constituent to form dicalcium silicate which fuses only at much higher temperatures. As heating is continued, all of the less refractory components are eliminated by reaction with the refractory granular material to bond all the granules together in a load bearing product which softens only at very high temperature.

The basic refractory granules may be selected from suitably size graded materials or mixtures of the group comprised of dead burned dolomite, dead burned dolomitic magnesite and dead burned magnesite. Hard burned lime and/or pure silica may be added, if necessary, to obtain the desired CaO to $SiO_2$ ratio. It is important that the CaO to $SiO_2$ ratio in the basic refractory material is in excess of that required to form dicalcium silicate. If the ratio is initially 1.87 to 1 or roughly 2 to 1, dicalcium silicate will form within the basic refractory grain itself upon heating without providing the necessary bond between grains. However, when the CaO is in excess, it will react with the $SiO_2$ in the non or less refractory material to form dicalcium silicate on the surface of the basic grains and thus bond all of them together. The actual ratio of CaO to $SiO_2$ required in the basic material will be dependent upon the proportion of each ingredient in the batch. However, for the preferred proportion set forth, this ratio should range between 2.5 and 3 to 1. The basic refractory material preferably constitutes from about 70 to 90%, by weight, of the batch.

The nonrefractory material may be natural or preformed and may be selected from any of the known calcium silicates where lime and silica are present in approximately equal proportions. The preferred nonrefractory material is wollastonite or wollastonite slag. The mineral wollastonite has the theoretical formula $CaO \cdot SiO_2$, equivalent to about 48.3% CaO and 51.7% $SiO_2$, by weight. This mineral melts incongruently at 2811° F. Wollastonite slag, which is phosphorous furnace slag, contains over 90% of the mineral wollastonite and minor amounts of MgO, $Al_2O_3$, FeO and $P_2O_5$. This nonrefractory material preferably is present in the mixture in amounts of from about 10 to 30% by weight.

One of the problems encountered when gunning a refractory material is the high losses due to refractory material bouncing back off a wall upon which it is being emplaced. This loss is termed "rebound" in the art. Rebound loss has been as high as 40 to 50%. However, a relatively thin coating of wollastonite slag on the refractory granular particles can reduce rebound losses substantially.

If desired, up to 1% of bentonite and up to 2% of sodium silicate may be added to the mixture as a gunning and sintering aid respectively. It has been found that the best results are obtained when the total mixture of granules and coating material is size graded so that about 50%, by weight, is −4+65 mesh and about 50%, by weight, is −65 mesh. Preferably, from 40 to 60% of the −65 mesh material should rest on a 325 mesh screen. It is also desirable that the majority (actually, in the range 40 to 60% by weight) of the +65 mesh fraction be coarser than 35 mesh screen.

The refractory composition of the invention may be employed in combination with gunning techniques to provide permanent wall linings or bottoms in basic open hearth or oxygen furnaces, but is most commonly employed for patching and maintenance of such furnaces and it will adhere even to slag surfaces.

The following example of the present invention is given by way of explanation and not by way of limitation. All parts and percentages are by weight. All chemical analyses are on the basis of an oxide analysis. All sizing is according to the Tyler standard sieve series and, of course, should be considered but typical.

A gunning mixture is prepared by mixing about 40 parts, by weight, of −6 mesh dead burned dolomite with about 4 parts, by weight, water (based on the total weight of the batch). Then about 30 parts, by weight, of ball mill fine dead burned magnesite is added to the batch followed by about 30 parts, by weight, of ball mill fine (substantially all −65 mesh, 90% −100 mesh and 40 to 60% −325 mesh) wollastonite slag. Preferably about 1 part, by weight, of clay spur bentonite, and about 2 parts, by weight, of dry, powdered sodium silicate, having a sodium oxide to silicon dioxide ratio on the order of 1 to 2, are also added. After the coarse basic granular particles are sufficiently coated with wollastonite slag, the mix is dried at about 250° F. The mixture is then gunned without an aqueous carrier fluid on a furnace wall maintained at a temperature of about 2900° F. As the coating on the particles comes into contact with the wall it becomes sufficiently sticky to allow the particles to adhere thereto with less than about 5% rebound. The nonrefractory coating continues to melt and reacts with the lime of the refractory constituent to form dicalcium silicate and binds the granular particles together.

The exemplary mixture has the following overall typical chemical analysis: 13.5% $SiO_2$, 32.5% CaO, 46.1% MgO, 2.5% $Al_2O_3$, 4.1% $Fe_2O_3$, and 0.5% ignition loss. The same mixture has the following typical screen analysis: 50% −4+65 mesh and 50% −65 mesh.

The foregoing explanation and examples are presented only by way of providing those skilled in the art with sufficient detail as to allow practice of the invention and not by way of limitation; and the true measure of the spirit and scope of the invention is as set forth in the following claims.

We claim:
1. Method of in situ fabrication of a refractory lining on a heated surface, comprising mixing basic refractory granular particles containing on the burned basis, a total of at least 90%, by weight, of MgO, $SiO_2$ and CaO and in which the weight ratio of CaO to $SiO_2$ is in excess of that required to form dicalcium silicate, and a sufficient amount of nonrefractory material consisting of a total of at least 85%, by weight, of $SiO_2$ and CaO and in which the weight ratio of CaO to $SiO_2$ is about 1 to 1, with a tempering fluid to provide a relatively thin coating of said nonrefractory material on the granular particles, drying said coated granular particles, and forcefully impacting the particles on a heated surface, said surface being at a temperature higher than that of incipient fusion of the nonrefractory material, said nonrefractory coating becoming sufficiently fluid upon contact with said surface to adhere thereto with a minimum of rebound, causing the nonrefractory material, and basic refractory to react to form dicalcium silicate binding matrix for the basic refractory particles thereby to provide a monolithic lining.

2. The method of claim 1 in which the nonrefractory material is wollastonite.

3. The method of claim 1 in which the batch contains in addition a carbonaceous material.

4. Method of in situ fabrication of a refractory lining on a heated surface comprising preparing a batch mixture consisting of from about 70 to 90%, by weight, of highly refractory basic particles composed essentially of MgO, CaO and $SiO_2$ and selected from the group consisting of dead burned dolomite, dead burned dolomitic magnesite, and dead burned magnesite, and from about 10 to 30%, by weight, of a nonrefractory material composed essentially of $SiO_2$ and CaO, the quantity of lime in the batch mixture being at least sufficient to form dicalcium silicate with all the silica therein with a tempering fluid to provide a relatively thin coating of said nonrefractory material on the granular particles, drying said coated granular particles and forcefully impacting the mixture on the heated surface, said surface being at a temperature higher than that of incipient fusion of the nonrefractory material, said nonrefractory coating becoming sufficiently fluid upon contact with said surface to adhere thereto with a minimum of rebound, thereby causing the nonrefractory material, and basic refractory to react to form dicalcium silicate which binds the basic refractory granular particles to provide a monolithic lining.

5. In combination with a metallurgical furnace or the like, a monolithic refractory lining provided in situ by gunning while said furnace is maintained at an elevated temperature said lining being formed from a dry batch mixture consisting essentially of basic refractory granular particles containing on the burned basis, a total of at least 90%, by weight, of MgO, $SiO_2$ and CaO and in which the weight ratio of CaO to $SiO_2$ is in excess of that required to form dicalcium silicate, said particles having a coating of nonrefractory material consisting of a total of at least 85%, by weight, of $SiO_2$ and CaO and in which the weight ratio of CaO to $SiO_2$ is about 1 to 1, said nonrefractory material coating having reacted with the basic refractory granules to form dicalcium silicate to bind the granular particles together.

References Cited
UNITED STATES PATENTS

| | | | |
|---|---|---|---|
| 2,968,083 | 1/1961 | Lentz et al. | 264—30 |
| 3,093,497 | 6/1963 | Demaison | 106—59 |
| 3,141,790 | 7/1964 | Davies et al. | 106—58 X |
| 3,229,970 | 1/1966 | Henry | 264—30 X |

FOREIGN PATENTS

| | | |
|---|---|---|
| 153,177 | 9/1963 | Australia. |

ROBERT F. WHITE, *Primary Examiner.*

J. A. FINLAYSON, *Assistant Examiner.*